United States Patent [19]

Hanyuda et al.

[11] Patent Number: 5,403,536
[45] Date of Patent: Apr. 4, 1995

[54] METHOD FOR INJECTION MOLDING OF POLYETHYLENE TEREPHTHALATE RESIN

[75] Inventors: Takashi Hanyuda, Yonezawa; Toshihide Kasuga, Kaminoyama; Susumuhide Onuma, Yonezawa, all of Japan

[73] Assignee: Seiki Kabushiki Kaisha, Tokyo, Japan

[21] Appl. No.: 72,313

[22] Filed: Jun. 3, 1993

[30] Foreign Application Priority Data

Jun. 19, 1992 [JP] Japan .................... 4-160989

[51] Int. Cl.6 .................. B29C 45/03; B29C 45/20; B29C 45/72
[52] U.S. Cl. .................. 264/328.9; 264/328.15; 264/DIG. 46; 425/549; 425/DIG. 13
[58] Field of Search ....... 264/328.9, 328.15, DIG. 46; 425/549, 547, DIG. 13

[56] References Cited

U.S. PATENT DOCUMENTS

| | | | |
|---|---|---|---|
| 4,011,654 | 3/1977 | Beaudoin et al. | 264/56 |
| 4,011,655 | 3/1977 | Beaudoin et al. | 264/56 |
| 4,228,815 | 10/1980 | Juffa et al. | |
| 4,351,659 | 9/1982 | Beales et al. | |
| 5,073,689 | 12/1991 | Tabata et al. | |
| 5,135,377 | 8/1992 | Gellert | 264/328.15 |
| 5,139,724 | 8/1992 | Hofstetter et al. | 264/328.9 |
| 5,154,785 | 10/1992 | Tabata et al. | 264/63 |
| 5,282,735 | 2/1994 | Gellert | 264/328.15 |

FOREIGN PATENT DOCUMENTS

| | | | |
|---|---|---|---|
| 3301272 | 7/1984 | Germany | 425/549 |
| 4035194 | 5/1992 | Germany | 425/549 |

*Primary Examiner*—Mathieu D. Vargot
*Attorney, Agent, or Firm*—Elliot M. Olstein; Raymond J. Lillie; William Squire

[57] ABSTRACT

A method of injection molding of polyethylene terephthalate resin which includes a process to heat and melt polyethylene terephthalate resin by means of plasticizing system, and inject the molten polyethylene terephthalate resin under a desirable injection molding pressure from nozzle part 8 through manifold part 9 and runner part 1 into cavity 4, and at the same time of the injection molding, to perform the opening and closing motion of gate 3 part by melting or solidifying the solidified or molten polyethylene terephthalate resin remaining at the gate 3 part by means of the intermittent temperature control apparatus 7 made of a platinum wire provided with along the vicinity of the gate 3, so as to produce the moldings removing the residual sprue at the gate 3 part. By the present invention, the polyethylene terephthalate resin which is very difficult to process by injection molding, is produced as moldings not accompanying a whitening phenomenon but of a high quality with superior transparency.

3 Claims, 4 Drawing Sheets

PRIOR ART

METHOD FOR INJECTION MOLDING OF POLYETHYLENE TEREPHTHALATE RESIN

BACKGROUND OF THE INVENTION

1. Field of Invention

The present invention relates to a method of injection molding of polyethylene terephthalate resin which has prominent moldability by using a platinum wire which has a good resistance to oxidation and considerable temperature difference of the platinum wire, enabling to produce a coil heating wire with a slender diameter.

2. Description of the Prior Art

In general, polyethylene terephthalate resin, hereinafter referred to as "PET resin", is used as a raw material for injection molding such as various types of medical bottles or containers, preforms for decanter bottles (Cold-Parison) and the like.

More particularly, (1) a bottle made from the PET resin is transparent, of good gloss and appearance, and easy to coloring;

(2) the weight of the bottle is one seventh to one tenth compared with the same capacity of a glass bottle, and the mechanical strength of the bottle is strong enough so that the bottle does not break even if it falls to the ground;

(3) the bottle has good barrier property to gas permeability against oxygen, carbon dioxide or other gases, thereby enabling to preserve effectively a substance of contents;

(4) the bottle is odorless, of excellent property to maintain fragrance, and less adsorbent to flavor;

(5) molecules of PET resin are composed only of carbon, hydrogen and oxygen, therefore poisonous gases have not generated at incineration;

(6) combustion energy is comparatively small, i.e. 5,500 kal/kg, as almost same as timber, thus, the bottle shall not damage a incinerator;

(7) the bottle has outstanding chemical resistance to any acid and/or other solvents only excluding strong bases and some of special bath liquids; and, (8) the bottle meets the Japanese standards based on the Food Sanitation Act and also meets the standards and regulations of Food and Drug Administration in U.S.A., thereby the bottle has eminent food hygienic property.

Thus, the PET resin and its products like a medical bottle or container has various significant features and versatile uses.

FIG. 5 and FIG. 6 show the main portions of an apparatus of injection molding of the PET resin in the prior art; where 1 is a runner part, 2 is a sub-runner part, 3 is a gate, and 4 shows cavity respectively.

This cavity 4 is provided with the shape to form the preform for a beverage bottle (Cold-Parison) as shown in FIG. 7.

Also shown in FIG. 5, a conical probe 5a which penetrates through a runner part 1 in a longitudinal direction, is provided with a body heater 6 thereby heating the runner part 1, and in FIG. 6, a conical probe 5b is provided with the body heater in a longitudinal direction to be included in and to heat a runner part 1.

Based on these constructions as described hereinabove, in the case when the body heater 6 is operated to inject the PET resin in molten conditions under a desired injection pressure, the PET resin is injected from the runner part 1 through the sub-runner part 2 and the gate 3 into the cavity 4, and as shown in FIG. 7, Cold-Parison a having a sprue sub-runner part a 1 is produced.

And as the sprue sub-runner a 1 is whitened partly, this whitened part is to be cut along the c—c cut line at the next step.

As stated hereinabove, while the moldings of the PET resin by the method of injection molding in the prior art is transparent in the normal operation, there is a problem of whitening phenomenon of moldings that a bit of solid and not molten resin near the gate (gate land) flows through the line during the molding process, so that the whitened resin is produced as the sprue sub-runner.

Thus, in general, the processing of PET resin by the direct gate method is one of the most difficult methods of injection molding among the crystalline resins, and the moldings of PET resin does not satisfy the desirable and required functions, especially its mechanical strength due to whitening phenomenon of moldings. Therefore, in general, the direct gate method is usually not adopted to manufacture the medical tubes or containers, such as blood-collecting tubes and others, also the preform for beverage bottles (Cold-Parison) both of which are used to be utilized in many fields; however, even in a few cases when this method should be adopted for manufacturing of PET injection molding, it is unavoidable to have a shape provided with a sprue sub-runner (cutting after molding; ref. FIG.7) which should adsorb whitening, and as the result this method shall require ineffective consumption of a raw material, inferior quality (whitening dispersion) and need a cutting process, and furthermore, the medical container shall be manufactured in clean rooms, therefore the diffusion or scattering of resin residues must be avoided at the cutting process.

BRIEF SUMMARY OF THE INVENTION

This invention is achieved in the way of looking at the aforementioned matters, and relates to the method of injection molding of PET resin to heat and melt by means of plasticization of PET resin as a material, and to mold by injection molding the molten resin passing a nozzle part through a manifold and runner parts into cavity, and at the same time this method makes an opening and a closing motion of gate part by melting or solidifying the solid or molten resin remaining at the gate part by means of intermittent temperature control apparatus made of a platinum wire provided in line with the gate part, thereby producing the moldings where the remaining sprue at the gate part is removed.

Also, this intermittent temperature control apparatus made of a platinum wire of the invention has feature of capable to control along the outer periphery of the gate part, and furthermore, this intermittent temperature control apparatus can control along the location passing the molten resin from the runner part to the vicinity of the gate part.

The PET resin material maintains the molten condition required for injection molding by means of plastization. Under the molten condition of PET resin, the operation of injection molding is proceeded, where the intermittent temperature control apparatus operates to heat partially the gate before the start of operating the injection molding apparatus, thereby heating and melting rapidly the PET resin cooled and solidified at the gate part. During the time, the intermittent temperature control apparatus is able to melt immediately the solidified or softened resin at the gate part mainly because the intermittent temperature control apparatus uses a platinum wire as one of the materials, so as to respond to heat very effectively.

In these situations, PET resin shall be protected from appearance or outgrowth of the whitening phenomenon due to the shortage of temperature by the present invention.

In such a way, when the operation of injection molding finishes, the intermittent temperature control apparatus stops the working to heat the gate part locally.

Then, the molding as taking out by opening motion of the injection molding has been manufactured in good molding conditions of transparency only leaving a bit of trace at the gate part.

DETAILED DESCRIPTION OF THE PREFERRED EMBODIMENTS

Figure 1:
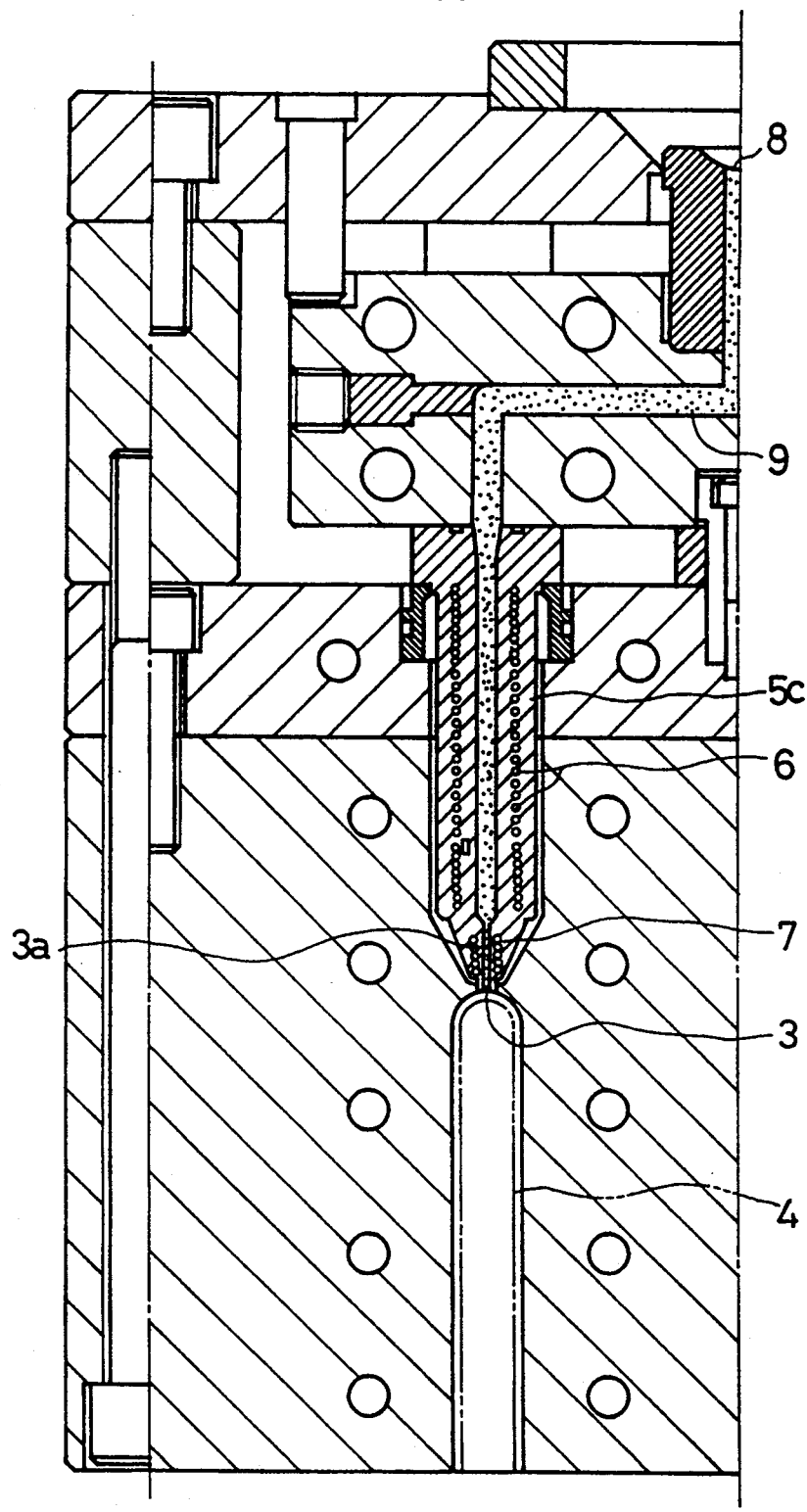
FIG. 1 is the cross-sectional drawing of the main portion of the apparatus denoting one embodiment for effecting the method of the injection molding of PET resin of the present invention.
Figure 2:
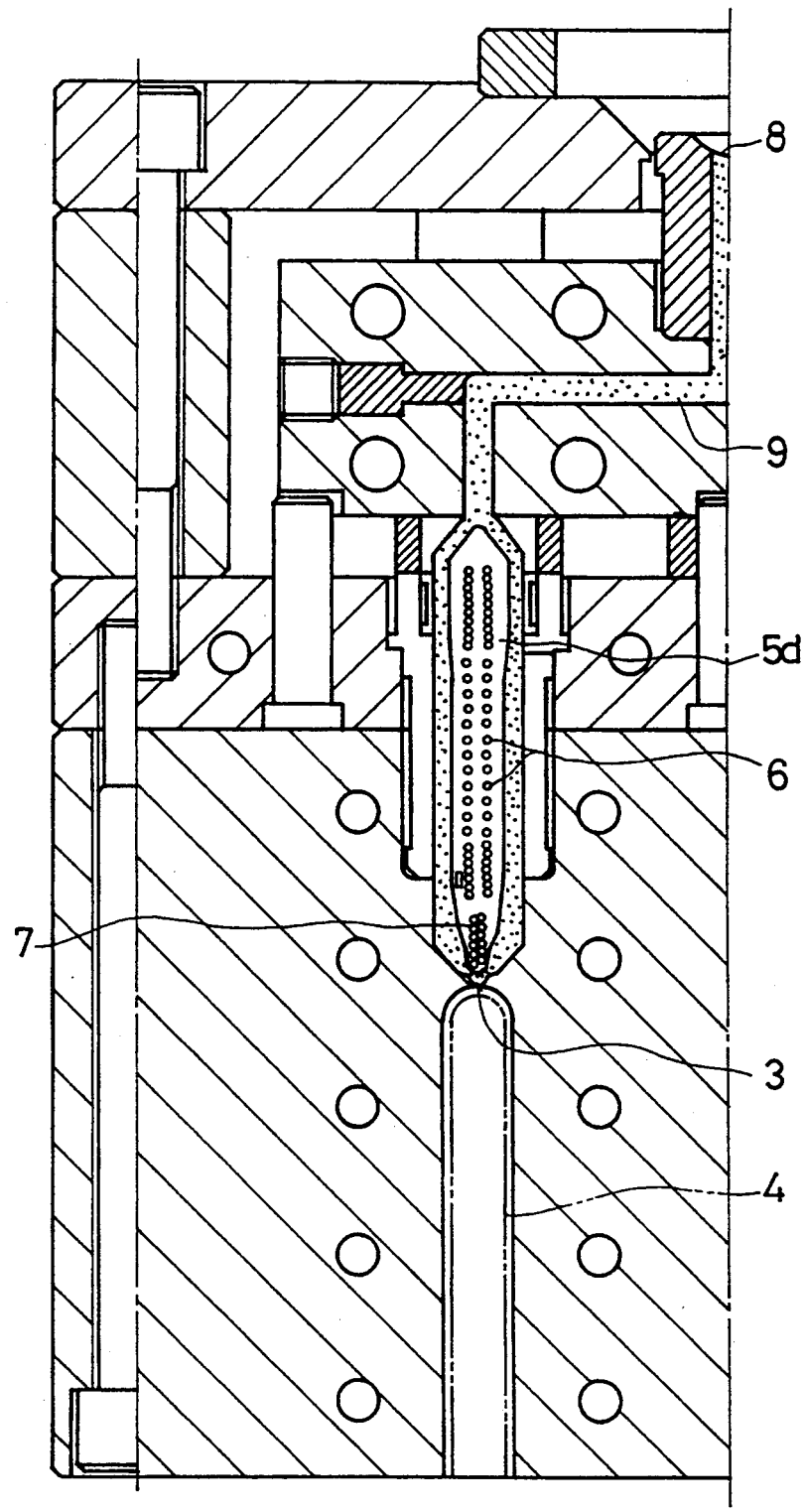
FIG. 2 is the cross-sectional drawing of the main portions of apparatus denoting another embodiment for effecting the other method of the injection molding of PET resin of the present invention.

The embodiments of the present invention are then illustrated in accordance with the apparatus for injection molding with the different structures as shown in FIG. 1 and FIG. 2.

In each drawing, reference numeral 1, numeral 3, numeral 4 and numeral 6 are the same structures as in the prior art therefore, the detailed explanation of them are to be left out.

Numeral 7 denotes the intermittent temperature control apparatus made of a platinum wire which is provided with the vicinity of the gate 3, the platinum wire with slender and small diameter of which is wound up in a coil, so as to turn on electricity and to heat gate 3 intermittently.

FIG. 1 shows that a platinum wire is provided with and enclosed in the outer periphery of the gate land 3a as an electrical heating wire 7, the gate land 3a of which connects and runs through the gate 3 and the vicinity of the conic part of the top of conic probe 5c passing through the runner part 1.

Also FIG. 2 shows that a platinum wire with a small diameter is provided with wound up in a coil on the top of conic probe 5d enclosed in the runner part I in the longitudinal direction, thus the platinum wire is used as an electrical heating wire 7 capable of heating in the vicinity of the gate 3.

Under the aforementioned structure, the PET resin in the runner part 1 is in the heated and molten condition by means of the body heater 6, and also the PET resin passing through the manifold a, nozzle 8 to the plasticizing apparatus which is not shown in the drawing is in the heated and molten condition in like manner.

Before proceeding the injection molding under the predetermined desirable injection pressure, the PET resin in the gate part 3 portion is in the cooled and solidified condition or softened condition, therefore the PET resin is heated and molten in a moment by the operation of the intermittent temperature control apparatus 7 made of a platinum wire, and as the result, the so-called gate 3 is opened. Although the thermal distribution at the gate 3 part is dispersed, the gate 3 parts is heated immediately by the rapid exothermic reaction of the platinum wire, and as the result, the PET resin is well molten and is capable to inject, thus a desired quantity of the PET resin is injected into the cavity 4 by the required injection molding operation.

After the injection molding operation is completed, the heating in the vicinity of the gate 3 is stopped by the termination of the electricity supply by means of the platinum wire, so as to cool, solidify and/or soften the PET resin at the gate 3 part.

In the course of these operations, the gate 3 closes and the injection moldings are formed at the cavity 4. By repeating the same operations similarly, the injection molding operations of the same repetition is performed.

Figure 3:
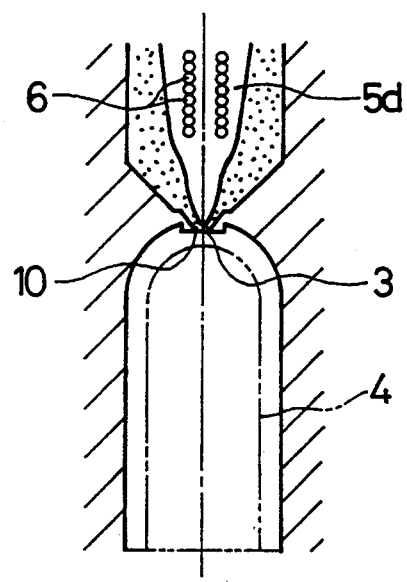
FIG. 3 is also the cross-sectional drawing of the main portions of apparatus denoting one another embodiment for effecting the other method of the invention.
Figure 4:
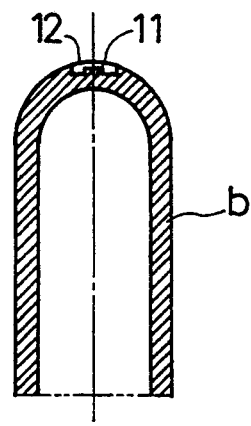
FIG. 4 The cross sectional drawing illustrating the above mentioned molding.
Figure 5:
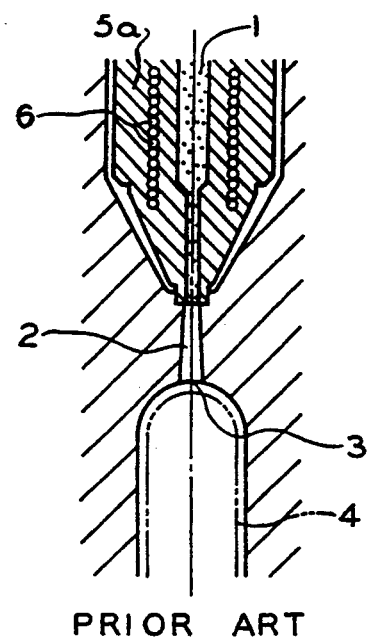
FIG. 5 The cross-sectional drawing of the main portions of one embodiment by the prior art.
Figure 6:
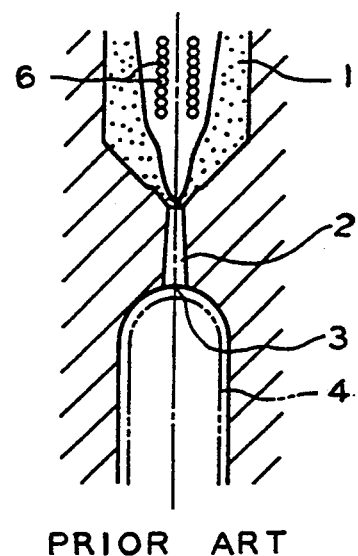
FIG. 6 The cross-sectional drawing of the main portions of another embodiment by the prior art.
Figure 7:
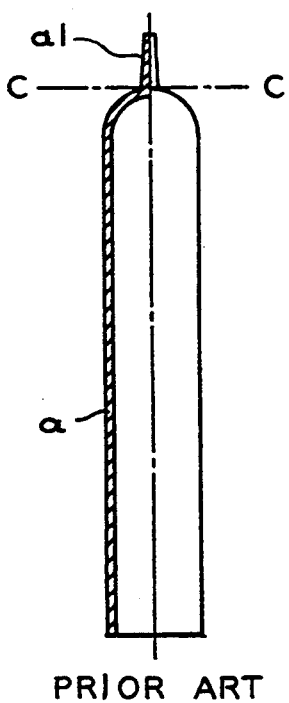
FIG. 7 The cross-sectional drawings of the moldings manufactured by the prior art shown in FIG. 5 and FIG. 6.

As the operations of heating and melting of the PET resin at the gate part are performed moderately and precisely by means of the intermittent heating operation of the platinum wire, the PET resin is well molded without troubles such as whitening phenomenon caused by shortage of temperature and others, and also does not produce a sub-runner which is used to derive in the method by the prior art, thereby the injection molding of the PET resin is performed economically and effectively.

in the case when Cold-Parison b for the blood-collecting tubes is molded as shown in FIG. 4, the PET resin is formed to project the gate 3 into the inside of connecting part 10 of the cavity 4 as shown in FIG. 3, thereby the gate trace 11 is projecting slightly into the inside of the surface 12 of Cold-Parison b, and there is an advantage of evading the hygienic trouble of direct contact by fingers.

By the present invention, it is capable to control temperature limiting the place nearby the gate only, and to have a moderate opening diameter and a cutting gate, and the platinum wire of the invention is capable to melt completely the most of the PET resin in the gate land being maintained the high thermal capacity capable of melting the predetermined PET resin at the fixed place near the gate, thereby able to let flow into the inside of the cavity. Furthermore, the temperature range of the PET resin between solidifying point and melting point is narrower than those of other resins, therefore there may be the possibilities to cause a dispersion of gate traces (remainings) and/or a gate height of the molding due to the delicate small differences of the temperatures of gate land at the molding (opening of the molding), however, these possibilities are removed by the effect of using the intermittent temperature control apparatus made of a platinum wire.

What is claimed is:

1. A method of injection molding a polyethylene terephthalate resin to produce a molded article, comprising:

heating and melting the resin;

pressurizing the molten resin and injecting the pressurized molten resin from a nozzle through a manifold, a runner, and then a gate into a molding cavity;

cyclically controlling the temperature of the gate by employing a platinum wire at the vicinity of the gate to melt intermittently and solidify the resin in the gate at a rapid repetition rate to preclude substantially the generation of discolored resin in the molded article at the gate; and removing the residual sprue from the article at the gate to produce the molded article.

2. The method of claim 1 wherein the gate has an outer periphery, and the controlling step includes controlling the temperature of the outer periphery to control cyclically the temperature of the outer periphery.

3. The method of claim 1 wherein the controlling step includes controlling the temperature of the flowing resin from the runner to the vicinity of the gate.

* * * * *

UNITED STATES PATENT AND TRADEMARK OFFICE
CERTIFICATE OF CORRECTION

PATENT NO.  : 5,403,536
DATED       : April 4, 1995
INVENTOR(S) : Takashi Hanyuda, et. al.

It is certified that error appears in the above-identified patent and that said Letters Patent is hereby corrected as shown below:

Title page, item [75] inventors: "Susumuhide Onuma" should read--Susumu Onuma--.

Signed and Sealed this

Eighth Day of October, 1996

*Attest:*

BRUCE LEHMAN

*Attesting Officer*       Commissioner of Patents and Trademarks